United States Patent
Eidam et al.

(10) Patent No.: US 6,742,620 B2
(45) Date of Patent: Jun. 1, 2004

(54) POWER STEERING SYSTEM WITH VEHICLE BRAKING STATE INPUT FOR VIBRATION REDUCTION

(75) Inventors: Dirk-Uwe Eidam, Refrath (DE); Eric Leonard Branger, Koeln (DE); Stephan Presser, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,585

(22) Filed: Jul. 29, 2002

(65) Prior Publication Data

US 2003/0019687 A1 Jan. 30, 2003

(30) Foreign Application Priority Data

Jul. 28, 2001 (EP) ............................................. 01118394

(51) Int. Cl.[7] ................................................ B62D 5/04
(52) U.S. Cl. ............................ 180/446; 701/41; 701/42
(58) Field of Search ................................. 180/443, 446, 180/444; 701/41–43, 70–72, 82, 83

(56) References Cited

U.S. PATENT DOCUMENTS

| | | | | |
|---|---|---|---|---|
| 5,116,078 A | * | 5/1992 | Kanazawa et al. | 280/5.503 |
| 5,490,068 A | * | 2/1996 | Shimizu et al. | 701/38 |
| 5,983,150 A | * | 11/1999 | Sasaki | 701/48 |
| 6,064,931 A | * | 5/2000 | Sawada et al. | 701/41 |
| 6,122,584 A | * | 9/2000 | Lin et al. | 701/70 |
| 6,134,490 A | * | 10/2000 | Ito et al. | 701/42 |
| 6,286,621 B1 | * | 9/2001 | Mukai et al. | 180/446 |
| 6,453,226 B1 | * | 9/2002 | Hac et al. | 701/48 |
| 6,647,329 B2 | * | 11/2003 | Kleinau et al. | 701/41 |

* cited by examiner

*Primary Examiner*—Lesley D. Morris
*Assistant Examiner*—L. Lum
(74) *Attorney, Agent, or Firm*—Gary Smith

(57) ABSTRACT

A power steering system in which an electric motor (9) makes available a damping torque to a steering system via a mechanical transmission (4). The transmission (4) is arranged between the steering wheel (2) and a steering rack (5). The electric motor (9) is actuated by a control unit (1) in accordance with the steering torque sensed by a sensor (3) and the vehicle speed sensed by a sensor (10). In addition, a damping module (8) of the control unit (1) receives binary or continuous signals relating to the braking state, in particular relating to the brake activation (11) and to cornering (9). By means of these signals the damping torque which is generated by the electric motor (9) can be adapted in such a way that vibrations which are caused by unequal wear of the brakes in the steering system are reduced.

18 Claims, 1 Drawing Sheet

POWER STEERING SYSTEM WITH VEHICLE BRAKING STATE INPUT FOR VIBRATION REDUCTION

BACKGROUND OF INVENTION

1. Field of the Invention

The invention relates to motor vehicle power steering systems and, more specifically, to such a power steering system comprising a control unit for defining the torque made available to the steering system by a motor, the control unit receiving input signals relating to the braking state of the motor vehicle.

2. Background of the Invention

Power steering systems are used to add a boosting torque to the torque that the driver applies manually on the steering wheel. As a result, even large steering systems that are difficult to move and which are connected to large inertia masses can be moved by the driver with relatively little manual application of force.

DE 43 34 261 A1 discloses a power steering system for a motor vehicle in which the boosting torque supplied to the steering system by an electric motor is determined primarily on the basis of the steering angle and the vehicle speed. However, in contrast to conventional systems, the vehicle speed is not determined exclusively by reference to the rotational speed of the wheels. As locking or slipping of the wheels can lead to a difference between the true vehicle speed and the speed which is determined by means of the rotational speed of the wheels, the signals of an antiskid braking system are used in order to acquire a more realistic estimated value for the vehicle speed. In addition, the control system can also be informed directly as to whether the antiskid brake system is active so that in this case the control can operate with changed parameters that take into account, for example, the estimated road friction.

In motor vehicle technology, what is referred to as brake judder constitutes a known serious problem that causes the motor vehicle industry considerable costs owing to warranty claims. Brake judder is due to a chain of events, at the beginning of which there is unequal wear of the brake disks which leads to thickness variation of the brake disk (DTV: disk thickness variation). This DTV produces a harmonic modulation of the braking force during braking. The oscillations of the braking force in turn excite different modes of the wheel suspension, the vibrations being transmitted via a kinematic coupling to the steering system and in particular to the steering rod of the steering system. The oscillations of the steering rod—if they lie in a specific critical frequency range—are in turn transmitted to the steering wheel and excite an oscillation of the steering gear, of the steering column and of the wheels. This oscillation is referred to as brake judder.

In order to suppress the brake judder, various measures are known which however each have specific disadvantages. For example, the harmful effects of disk thickness variation (DTV) can be reduced by pulling the brake linings back into their non-active position. The disadvantage of this measure is an increased brake pedal displacement distance to be traveled. In addition, the wheels suspension modes can be damped by hydraulic bushings. However, this approach is very costly. In addition, there is a conflict of objectives in that optimum adjustment can be carried out either only with respect to unbalance vibrations or only with respect to braking vibrations. On the other hand, adaptation with respect to both effects constitutes a compromise with which, as a rule, a satisfactory result is obtained with respect to neither of the effects.

It is also possible to use hydraulic damping devices in a hydraulic power steering system or external steering dampers in order to damp the oscillations of the brakes. The disadvantages here are high costs and degradation of the response of the steering system. Finally, a vibration mode separation can be achieved by increasing the inertia of the steering wheel. A disadvantage here is the increased mass of the steering wheel, which leads to higher stability requirements for the steering column and the steering system in order to comply with the target values for the frequency behavior of the steering system. This entails further increases in costs and weight.

SUMMARY OF INVENTION

The present invention provides a method and a device for power steering a motor vehicle with which improved behaviour of the steering system can be ensured in a simple and cost-effective way, in particular during braking operations.

This object is achieved by means of a method having the features of patent claim 1, and a power steering system having the features of patent claim 8. Advantageous refinements are contained in the subclaims.

With the proposed method for power steering a motor vehicle, a damping torque is supplied to the steering system of the vehicle by a motor, preferably an electric motor. This damping torque depends, inter alia, on the braking state of the motor vehicle and is specified in such a way as to suppress mechanical vibrations (oscillations) of the steering system that originate from a brake activation.

With the method according to the invention, suppression of the brake judder or of brake vibrations is thus integrated into a power steering system that is already present in the motor vehicle. This integration merely requires the control of the power steering system be adapted to take into account the braking state of the motor vehicle. As such, the invention can be implemented cost-effectively in terms of control equipment.

In the proposed method, the braking state of the motor vehicle is preferably sensed by means of signals which relate to one or more of the following: the brake activation (active or inactive), the brake pedal displacement distance traveled, the braking force boost of the servobrake, the brake line pressure, the current braking mode of an anti-lock braking system, cornering in terms of direction and degree, the braking acceleration of the motor vehicle, and/or the operating state of an electronic vehicle stability augmentation (VSA) system. The greater the number of the aforesaid variables which are used in combination with one another, the greater the precision with which the damping torque of the power steering system can react to the brake vibrations of the steering system and ultimately suppress them.

According to one preferred embodiment of the method, the total boosting torque applied to the steering system is composed in a modular fashion of a plurality of components, which can include, in particular, a component known as the damping torque and which has a damping effect and which depends, inter alia, on the braking state of the motor vehicle. The suppression of the brake vibrations is predominantly carried out here by means of the damping torque that acts on the steering system in a damping fashion.

According to one predefined function, the damping torque can be determined in accordance with the vehicle speed, the steering angle, and/or the steering torque. The aforesaid function can be implemented, in particular, in the form of a look-up table, which permits flexible and individually adaptable behavior of the damping torque in a cost-effective way.

In the last-mentioned refinement of the method using a predefined function or a look-up table, the braking state of the motor vehicle is preferably taken into account in that, depending on the braking state, a different function or look-up table is selected for use. In this way, the braking state of the motor vehicle can easily be taken into account by the known control methods for power steering. At the same time, any desired degree of precision in the consideration of the braking state can be achieved by means of a correspondingly high number of functions or look-up tables that are available for selection.

The braking state can be taken into account in the power steering of a motor vehicle in a relatively simple fashion, while at the same time covering the most important cases by distinguishing, in terms of the braking state, the following three cases:

unbraked state, braking when traveling straight ahead, and braking when cornering A different function or look-up table is used to determine the damping torque in each of the cases. If higher precision of control is desired, the aforesaid cases in particular those in which the brake is active can be differentiated further and, for example, details of the braking operation can be taken into account more precisely in accordance with the abovementioned signals relating to the braking state and/or the degree of cornering.

The invention also relates to a power steering system for a motor vehicle that has a control unit for defining the torque to be supplied to the steering system by a motor. The aforesaid control unit has signal inputs for the reception of signals relating to the braking state of the motor vehicle and is defined in that it can carry out a method of the type explained above. The control unit is thus set up in such a way that it defines the boosting torque to be made available so that mechanical vibrations of the steering system originating from brake activation are suppressed.

The control unit can also be connected to signal inputs via which the brake activation state, the brake pedal displacement distance, the level of braking force boost, the level of brake line pressure, the operating mode of an anti-lock brake system (ABS), the presence of cornering, the braking acceleration, and/or the operating state of an electronic vehicle stability augmentation (VSA) system can be signaled. The control unit can also be of modular design, one of the modules calculating a component of the boosting torque to achieve a damping effect and which depends on the braking state of the motor vehicle. The signal inputs of the control unit can also include signals relating to the vehicle speed, the steering angle, and/or the steering torque. The absolute values and/or rates-of-change of these parameters may be used. The control unit preferably operates using at least one predefined function or a look-up table in order to determine on the basis of current input signals the boosting torque that is to be applied.

In the preferred embodiment of the invention, an electric motor is used to generate the damping torque, as it can be actuated and controlled very precisely, rapidly, and flexibly.

The invention will be explained in more detail below by way of example with reference to the drawing.

DETAILED DESCRIPTION

Figure 1:
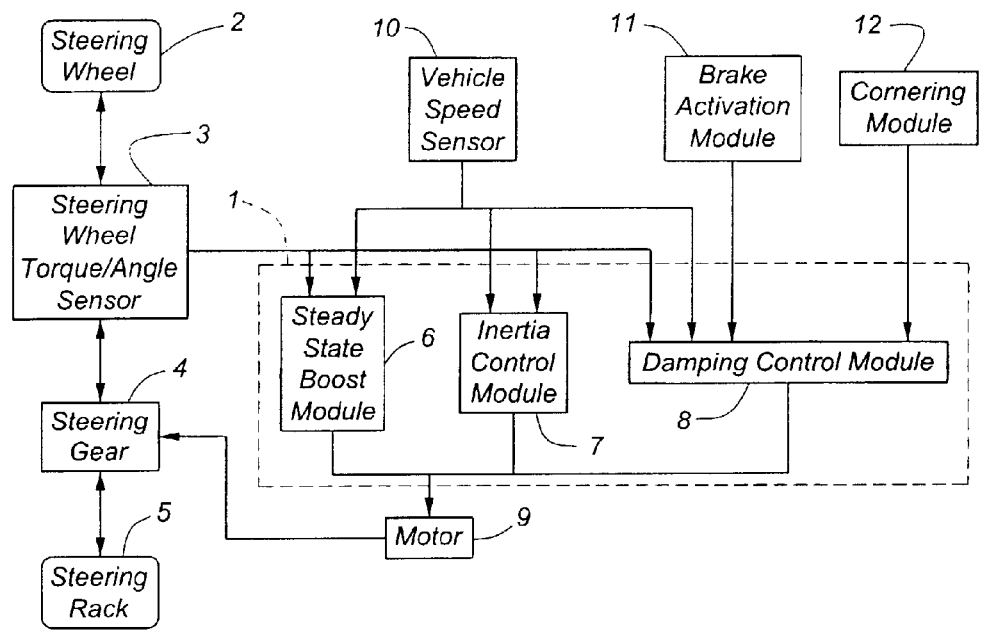
FIG. 1 is a schematic view of a power steering system according to the invention.

FIG. 1 depicts the present invention as implemented in an Electrical Power Assisted Steering (EPAS) system. To steer the vehicle, the vehicle driver (not shown) manually applies a steering torque to the steering wheel 2. The manually applied steering torque is communicated via a mechanical steering gear 4 to a steering rack 5 and is converted there into a corresponding steering movement of the wheels (not illustrated). In an EPAS system, a steering wheel sensor 3 for registering the steering wheel angular position and torque applied by the driver is disposed between the steering wheel 2 and the steering rack 5. A control unit 1 receives input signals from the torque sensor and other devices to be described below, and determines a required degree of boosting torque to be applied to aid the driver in the steering of the motor vehicle. The control unit 1 then activates an electric motor 9 that delivers the boosting torque to mechanical steering gear 4.

Control unit 1 receives signal inputs from a vehicle speed sensor 10, the steering wheel sensor 3, and other appropriate sensors (not shown). Control unit 1 may be of modular design having, for example, a steady-state boost module 6, an inertia control module 7, and a damping control module 8. The damping control module 8 serves mainly to prevent harmonics of the steering control. This is important because EPAS systems have a high degree of inertia in comparison with conventional steering systems owing to the transmission ratio and the inertia of the electric motor ($I_{System} = i^2_{En-ine\ tr-ns-ission} * I_{En-ine}$).

The damping torque to be applied is usually determined by means of a look-up table or a suitable algorithm. The abovementioned signal inputs can be used as the input variable for the control unit 1. An increase in the damping component leads to improved suppression of interference and harmonics. However, on the other hand, the increased damping can cause the feedback sensation of the manual steering and the possibility of opposed steering to be adversely affected. The setting of the damping to a compromise value has the disadvantage that neither of the predefined steering objectives is achieved to an optimum degree.

According to the present invention, the control unit 1 has further signal inputs that indicate the braking state of the vehicle and other variables that are relevant to it. In the embodiment of FIG. 1, two further signal inputs are supplied to the damping module 8 from a brake activation module 11 and a cornering module 12. However, within the framework of the present invention it is also readily possible to use more or fewer signal inputs than illustrated and to connect them alternatively or additionally to other modules of the control unit 1.

In the simplest case, brake activation module 11 supplies a binary signal indicating whether the brake is active or not. Depending on this signal, the damping module 8 can operate with various look-up tables in order to determine a damping boost torque in accordance with the remaining vehicle parameters such as, for example, the steering angle or the vehicle speed.

Such control can be further refined by taking into account a signal from cornering module 12. In the simplest case this signal may be binary, merely distinguishing between when the vehicle is traveling straight ahead and when it is cornering, or it may indicate the amount of cornering experienced by the vehicle. The detection of cornering can be carried out, for example, on the basis of information relating to the steering angle, the steering torque and the vehicle speed, lateral acceleration experienced by the vehicle, and/or by the ABS or VSA system. When a binary signal is used for brake actuation and a binary signal is used for cornering, three different look-up tables may be used in the damping module 8, said look-up tables corresponding to the states:

no brake activation (with or without cornering);

brake activation without cornering; and brake activation with cornering.

A further improvement of the control behavior in the damping module 8 can be achieved if the brake activation module 11 and/or the cornering module 12 provide continuous signals relating to the degree of the braking operation and/or the degree of cornering. In this case, a correspondingly higher number of look-up tables adapted to the requirements can be used in the damping control module 8. Likewise, the dimension of the look-up tables used can be increased in order to take into account the degree of braking and/or the degree of cornering. Alternatively or in addition to the use of a look-up table, the damping control module 8 can operate with a mathematical function which additionally depends on the values for the degree of braking and/or the degree of cornering.

In addition to the signals for brake activation and/or cornering, the control system 1 can also receive input signals relating to other vehicle parameters such as the displacement distance of the brake pedal, the degree of braking power boost force, the brake line pressure, the operating mode of an ABS system, the braking acceleration sensed by an acceleration sensor or observation module, or information relating to the VSA system operating state. Since such information may already be available onboard a vehicle for use in other systems, its transmission to the control unit 1 of the power steering system entails only a low degree of expenditure.

As already explained above, in contrast to the system architecture illustrated in FIG. 1, the signals relating to the braking and/or cornering states can also be made available to the steady state boost module 6, inertia module 7, or other modules of the control unit 1 if present. These other modules may process the signals in a way similar to that explained for the damping control module 8.

In addition, the method described can be used to improve the braking stability. The vehicle stability is reduced owing to a combination of various effects in the tire and wheel suspension system. This situation can be improved if the EPAS system of one of the above-described brake detection methods is used by increased damping, reduced inertia compensation, reduced friction compensation, a modified static boosting curve which, in the braking mode, produces in particular more pronounced locking at the center.

What is claimed is:

1. A method for power steering a motor vehicle comprising the steps of:

sensing a braking state of the motor vehicle;

determining a damping torque to be applied to a steering system of the motor vehicle to suppress mechanical vibrations of the steering system caused by activation of a braking system;

activating a motor to apply the damping torque to the steering system.

2. The method as claimed in claim 1, wherein the step of sensing a braking state comprises detecting signals indicating at least one of the following: braking system activation, brake pedal displacement, braking boost force, brake line pressure, operating mode of an anti-lock braking system, cornering, braking acceleration of the motor vehicle, and operating state of a vehicle stability augmentation system.

3. The method as claimed in claim 1, wherein the damping torque is determined depending upon at least one of the following parameters of the vehicle: vehicle speed, steering angle, and steering torque.

4. The method as claimed in claim 1, wherein the damping torque is determined at least in part in accordance with at least one of the following: a predefined function and a look-up table.

5. The method as claimed in claim 4, wherein the at least one predefined function and look-up table is selected based upon the braking state of the motor vehicle.

6. The method as claimed in claim 5, wherein the braking state is discriminated between unbraked travel, braking when the vehicle is traveling straight ahead, and braking when the vehicle is cornering.

7. The method as claimed in claim 5, wherein the selected function or look-up table depends, at least in part, on a degree of braking.

8. The method as claimed in claim 5, wherein the selected function or look-up table depends, at least in part, on a degree of cornering.

9. The method as claimed in claim 1, wherein the step of activating the motor comprises activating an electric motor.

10. A vibration damping system for a motor vehicle having a braking system and a steering system comprising:

at least one sensor detecting a braking state of the vehicle and generating at least one signal indicating the braking state;

a control unit receiving the signal from the sensor and determining a damping torque to be applied to the steering system to suppress mechanical vibrations of the steering system caused by activation of the braking system; and a motor activated by the control unit to apply the damping torque to the steering system.

11. A power steering system as claimed in claim 10, wherein the motor is an electric motor.

12. The system as claimed in claim 10 wherein the at least one signal indicates at least one of the following: braking system activation, brake pedal displacement, braking boost force, brake line pressure, operating mode of an anti-lock braking system, cornering, braking acceleration of the motor vehicle, and operating state of a vehicle stability augmentation system.

13. The system as claimed in claim 10 wherein the control unit determines the damping torque depending upon at least one of the following parameters of the vehicle: vehicle speed, steering angle, change in the steering angle and steering torque.

14. The system as claimed in claim 10 wherein the braking state is discriminated between unbraked travel, braking when the vehicle is traveling straight ahead, and braking when the vehicle is cornering.

15. The system as claimed in claim 10 wherein the damping torque is determined at least in part in accordance with at least one of the following: a predefined function and a look-up table.

16. The system as claimed in claim 15 wherein the at least one predefined function and look-up table is selected based upon the braking state of the motor vehicle.

17. The system as claimed in claim 15 wherein the at least one predefined function and look-up table is selected based, at least in part, upon a degree of braking.

18. The system as claimed in claim 15 wherein the at least one predefined function and look-up table is selected based, at least in part, upon a degree of cornering.

* * * * *